United States Patent
Wu et al.

(10) Patent No.: US 11,177,475 B2
(45) Date of Patent: Nov. 16, 2021

(54) TERNARY POSITIVE ELECTRODE MATERIAL, AND LITHIUM ION BATTERY

(71) Applicant: Contemporary Amperex Technology Co., Limited, Ningde (CN)

(72) Inventors: Qi Wu, Ningde (CN); Jinhua He, Ningde (CN); Changyin Ji, Ningde (CN); Tao Qiao, Ningde (CN); Kelun Wang, Ningde (CN)

(73) Assignee: Contemporary Amperex Technology Co., Limited

( * ) Notice: Subject to any disclaimer, the term of this patent is extended or adjusted under 35 U.S.C. 154(b) by 172 days.

(21) Appl. No.: 16/392,113

(22) Filed: Apr. 23, 2019

(65) Prior Publication Data

US 2020/0006766 A1    Jan. 2, 2020

(30) Foreign Application Priority Data

Jun. 27, 2018   (CN) .......................... 201810678176.0

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .............. C01P 2004/03; C01P 2004/62; C01P 2002/52; C01P 2006/11; C01P 2006/10;
(Continued)

(56) References Cited

U.S. PATENT DOCUMENTS

2012/0258366 A1   10/2012   Yu et al.
2015/0270545 A1    9/2015   Axelbaum et al.
(Continued)

FOREIGN PATENT DOCUMENTS

CN   103548186 A   1/2014
CN   103930374 A   7/2014
(Continued)

*Primary Examiner* — Jonathan G Jelsma
*Assistant Examiner* — Omar M Kekia
(74) *Attorney, Agent, or Firm* — Forge IP, PLLC (57) ABSTRACT

The present disclosure relates to a ternary positive electrode material and a battery using the ternary positive electrode material. The ternary positive electrode material includes secondary particles composed of primary particles. The secondary particles have an average particle diameter D50 of 6 μm-20 μm, BET of 0.2 m²/g-1 m²/g, and the number σ of primary particles per unit area of the secondary particles is 5 particles/μm²-100 particles/μm². The ternary positive electrode material has a formula of $Li_{1+a}[Ni_xCo_yMn_zM1_bM2_c]O_{2-d}N_d$, where element M1 and element M2 are each independently selected from at least one of Al, Zr, Ti, Mg, Zn, B, Ca, Ce, Te and Fe, element N is selected from at least one of F, Cl and S, and $0<x<1$, $0<y\leq0.3$, $0\leq z\leq0.3$, $-0.1<a<0.2$, $0\leq b<0.3$, $0\leq c<0.3$, $0\leq d<0.2$, $0\leq b+c\leq0.3$, $x+y+z+b=1$. The formed secondary particles have high compactness, thereby effectively improving the structural stability and the cycling performance at high or low temperature.

8 Claims, 2 Drawing Sheets

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2004/03* (2013.01); *C01P 2004/62* (2013.01); *C01P 2006/10* (2013.01); *C01P 2006/12* (2013.01); *C01P 2006/40* (2013.01); *H01M 2004/021* (2013.01); *H01M 2004/028* (2013.01)

(58) Field of Classification Search
CPC .............. C01P 2004/61; C01P 2006/40; C01P 2006/12; C01G 53/50; Y02E 60/10; H01M 4/525; H01M 10/0525; H01M 2004/021; H01M 4/505; H01M 2004/028; H01M 4/52

USPC ........................................................ 429/223
See application file for complete search history.

(56) References Cited

U.S. PATENT DOCUMENTS

2016/0254539 A1   9/2016  Kagei et al.
2017/0149087 A1*  5/2017  Maruo .............. H01M 10/0525

FOREIGN PATENT DOCUMENTS

| CN | 105118985 A | 12/2015 |
| CN | 106229489 A | 12/2016 |
| CN | 107644981 A | 1/2018 |
| CN | 107644982 A | 1/2018 |
| GB | 2533720 A | 6/2016 |
| WO | WO2017029166 A1 | 2/2017 |

* cited by examiner

TERNARY POSITIVE ELECTRODE MATERIAL, AND LITHIUM ION BATTERY

CROSS-REFERENCE TO RELATED APPLICATIONS

The present application claims priority to Chinese Patent Application No. 201810678176.0, filed on Jun. 27, 2018, the content of which is incorporated herein by reference in its entirety.

TECHNICAL FIELD

The present application relates to the technical field of lithium ion battery, and particularly, to a ternary positive electrode material for a lithium ion battery, and a lithium ion battery comprising the ternary positive electrode material.

BACKGROUND

With a rapid rise of power automobile industry, lithium-ion batteries with high energy density have been rapidly developed. However, due to the low capacity, the currently available lithium iron phosphate batteries cannot meet the demand for long cruising range. The ternary materials, due to their relatively high capacity meeting the requirements of long cruising range, have become a major research field of positive electrode materials of power batteries.

At present, there are some problems to be solved urgently in ternary materials, such as high content of miscellaneous lithium on the surface, serious gas production, poor structural stability, insufficient mechanical strength of secondary particles, and thus the ternary materials tend to be broken during cycling and easy to have side reactions with electrolyte. At present, the major modification methods involve doping and coating, but these modification methods cannot improve the substantial problems of poor mechanical strength of the secondary particles, side reactions with the electrolyte after broken during the cycling. The strength of the secondary particles is closely correlated with the distribution and size of primary particles. Therefore, the uniformity of distribution and the density of the primary particle are critical to the performance of ternary materials.

The present disclosure aims to provide a ternary material with uniformly distributed and suitably sized primary particles and excellent performance.

SUMMARY

In view of the deficiencies the existing ternary positive electrode materials in performances of cycling and high temperature safety, the present disclosure provides a ternary positive electrode material composed of secondary particles, which have uniformly distributed and suitably sized primary particles. The ternary positive electrode material according to the present disclosure has an improved cycling performance at high or low temperature and an effectively improved performance of resisting expansion, while the high energy density can be ensured.

The ternary positive electrode material provided in the present disclosure includes secondary particles composed of primary particles. The secondary particles have an average particle diameter D50 in a range of 6 μm to 20 μm and a BET in a range of 0.2 m$^2$/g to 1 m$^2$/g. A number σ of the primary particles per unit area of the secondary particles is in a range of 5 particles/μm$^2$ to 100 particles/μm$^2$. The ternary positive electrode material has a formula of $Li_{1+a}[Ni_xCo_yMn_zM1_bM2_c]O_{2-d}N_d$ where element M1 and element M2 are each independently selected from at least one of Al, Zr, Ti, Mg, Zn, B, Ca, Ce, Te and Fe, element N is selected from at least one of F, Cl and S, 0<x<1, 0<y≤0.3, 0≤z≤0.3, −0.1<a<0.2, 0≤b<0.3, 0≤c<0.3, 0≤d≤0.2, 0≤b+c<0.3, and x+y+z+b=1.

The present disclosure further provides a method for preparing the above ternary positive electrode material. The method includes steps of:

(1) adding a ternary precursor, a lithium salt, and optionally a compound containing element M1 into a high-speed mixer, and mixing for 0.5 h to 3 h; placing mixed materials in a sintering furnace under air or oxygen atmosphere, and carrying out sintering for 5 h to 25 h at a temperature of 700° C. to 1000° C., so as to obtain a positive electrode material matrix, wherein the ternary precursor has a formula of $[Ni_xCo_yMn_z](OH)_2$, where 0<x<1, 0<y≤0.3, 0≤z≤0.3, the ternary precursor has an average particle diameter D50 in a range of 6 μm to 20 μm and a BET in a range of 3 m$^2$/g to 30 m$^2$/g; the lithium salt is lithium hydroxide or lithium carbonate; M1 is selected from at least one of Ca, Al, Zr, Ti and Te, and a mass ratio of M1 element to the mixed materials is in a range of 0 ppm to 6000 ppm, preferably in a range of 100 ppm to 6000 ppm; and (2) mixing a ternary material prepared in step (1) with a compound containing element M2, and carrying out sintering for 2 h to 10 h at a temperature of 200° C. to 700° C., so as to obtain a ternary material product coated with the compound containing element M2, wherein M2 is selected from at least one of Mg, Zn, Al, B, Ce and Fe, and a mass ratio of M2 element to the ternary material product is in a range of 0 ppm to 3000 ppm, preferably in a range of 500 ppm to 3000 ppm.

The present disclosure further provides a method for determining a number σ of the primary particles per unit area of the secondary particles in the above ternary positive electrode material according to claim 1. The method includes steps of:

(1) performing a SEM measurement on a sample of the ternary positive electrode material comprising the secondary particles having an average diameter D50 in a range of 6 μm to 20 μm, so as to obtain a SEM image at a magnification of 10000×;

(2) calculating the number σ of the primary particles per unit area of the secondary particles in the ternary positive electrode material based on the SEM image obtained in step (1) by using following equations:

$$\sigma = \{(x1+x2)/2 * (y1+y2)/2\}/(A/C * B/C), \text{ particles}/\mu m^2,$$

wherein x1 represents a number of the primary particles along a lower edge of the SEM image of the secondary particles;

x2 represents a number of the primary particles along an upper edge of the SEM image of the secondary particles;

y1 represents a number of the primary particles along a left edge of the SEM image of the secondary particles;

y2 represents a number of the primary particles along a right edge of the SEM image of the secondary particles;

A represents an actual length in millimeter of the upper or lower edge of the SEM image of the secondary particles;

B represents an actual length in millimeter in millimeter of the left or right edge of the SEM image of the secondary particles; and C represents an actual length in a unit of mm/μm of a scale of 1 μm in the SEM image of the secondary particles;

wherein when counting the number of the primary particles in the SEM image of the secondary particles, a primary particle, which is partially included in the SEM image, is counted as one primary particle.

The number σ of the primary particles per unit area of the secondary particles is a parameter reveals the size and distribution of the primary particles in the secondary particles.

The present disclosure further provides a lithium ion battery, comprising a positive electrode, a negative electrode, a separator arranged between the positive electrode and the negative electrode, and electrolyte. The positive electrode is made of a positive electrode material, which is the ternary positive electrode material described above.

DESCRIPTION OF EMBODIMENTS

In order to facilitate the understanding of the present disclosure, the present disclosure provides following embodiments. It should be understood by those skilled in the related arts that these embodiments are merely intended to explain the present disclosure, rather than limiting the present disclosure.

The ternary positive electrode material provided in the present disclosure includes secondary particles composed of primary particles. The secondary particles have an average particle diameter D50 in a range of 6 μm to 20 μm and a BET in a range of 0.2 m$^2$/g to 1 m$^2$/g. A number σ of the primary particles per unit area of the secondary particles is in a range of 5 particles/μm$^2$ to 100 particles/μm$^2$. The ternary positive electrode material has a formula of $Li_{1+a}[Ni_xCo_yMn_zM1_bM2_c]O_{2-d}N_d$ where element M1 and element M2 are each independently selected from at least one of Al, Zr, Ti, Mg, Zn, B, Ca, Ce, Te and Fe, element N is selected from at least one of F, Cl and S, 0<x<1, 0<y≤0.3, 0≤z≤0.3, −0.1<a<0.2, 0≤b<0.3, 0≤c<0.3, 0≤d<0.2, 0≤b+c<0.3, and x+y+z+b=1.

In an exemplary embodiment of the ternary positive electrode material of the present application, the ternary positive electrode material has a compact density greater than or equal to 3.3 g/cc.

In an exemplary embodiment of the ternary positive electrode material of the present application, the primary particles have a length a range of 100 nm to 1000 nm, and a width a range of 50 nm to 400 nm. More preferably, the primary particles have a ratio of length to width in a range of 2 to 20.

In an exemplary embodiment of the ternary positive electrode material of the present application, the number σ of the primary particles per unit area of the secondary particles in the ternary positive electrode material is a range of 5 particles/μm$^2$ to 50 particles/μm$^2$.

In an exemplary embodiment of the ternary positive electrode material of the present application, the BET is in a range of 0.3 m$^2$/g to 0.8 m$^2$/g.

In an exemplary embodiment of the ternary positive electrode material of the present application, in the formula of $Li_{1+a}[Ni_xCo_yMn_zM1_bM2_c]O_{2-d}N_d$, 0.6<x<1.

In an exemplary embodiment of the ternary positive electrode material of the present application, a total doping amount of the element M1 and element M2 in the ternary positive electrode material is a range of 200 ppm to 9000 ppm.

The present disclosure further provides a method for preparing the above ternary positive electrode material. The method includes steps of:

(1) adding a ternary precursor, a lithium salt, and optionally a compound containing element M1 into a high-speed mixer, and mixing for 0.5 h to 3 h; placing mixed materials in a sintering furnace under air or oxygen atmosphere, and carrying out sintering for 5 h to 25 h at a temperature of 700° C. to 1000° C., so as to obtain a positive electrode material matrix, wherein the ternary precursor has a formula of $[Ni_xCo_yMn_z](OH)_2$, where 0<x<1, 0<y≤0.3, 0≤z≤0.3, the ternary precursor has an average particle diameter D50 in a range of 6 μm to 20 μm and a BET in a range of 3 m$^2$/g to 30 m$^2$/g; the lithium salt is lithium hydroxide or lithium carbonate; M1 is selected from at least one of Ca, Al, Zr, Ti and Te, and a mass ratio of M1 element to the mixed material is in a range of 0 ppm to 6000 ppm, preferably in a range of 100 ppm to 6000 ppm; and (2) mixing a ternary material prepared in step (1) with a compound containing element M2, and carrying out sintering for 2 h to 10 h at a temperature of 200° C. to 700° C., so as to obtain a ternary material product coated with the compound containing element M2, wherein M2 is selected from at least one of Mg, Zn, Al, B, Ce and Fe, and a mass ratio of M2 element to the ternary material product is in a range of 0 ppm to 3000 ppm, preferably in a range of 500 ppm to 3000 ppm.

The present disclosure further provides a method for determining a number σ of the primary particles per unit area of the secondary particles in the above ternary positive electrode material. The method includes steps of:

(1) performing a SEM measurement on a sample of the ternary positive electrode material comprising the secondary particles having a diameter in a range of 6 μm to 20 μm, so as to obtain a SEM image;

(2) calculating the number σ of the primary particles per unit area of the secondary particles in the ternary positive electrode material based on the SEM image obtained in step (1) by using following equations:

$$\sigma = \{(x1+x2)/2 * (y1+y2)/2\}/(A/C * B/C), \text{particles}/\mu m^2,$$

wherein x1 represents a number of the primary particles along a lower edge of a 10K-fold SEM image of the secondary particles;

x2 represents a number of the primary particles along an upper edge of the 10K-fold SEM image of the secondary particles;

y1 represents a number of the primary particles along a left edge of the 10K-fold SEM image of the secondary particles;

y2 represents a number of the primary particles along a right edge of the 10K-fold SEM image of the secondary particles;

A represents an actual length in millimeter of the upper or lower edge of the 10K-fold SEM image of the secondary particles;

B represents an actual length in millimeter in millimeter of the left or right edge of the 10K-fold SEM image of the secondary particles; and C represents an actual length in a unit of mm/μm of a scale of 1 μm in the 10K-fold SEM image of the secondary particles;

wherein when counting the number of the primary particles in the 10K-fold SEM image of the secondary particles, a primary particle, which is partially included in the 10K-fold SEM image, is counted as one primary particle.

The number σ of the primary particles per unit area of the secondary particles is a parameter reveals the size and distribution of the primary particles in the secondary particles.

The present disclosure further provides a lithium ion battery, comprising a positive electrode, a negative electrode, a separator arranged between the positive electrode and the negative electrode, and electrolyte. The positive electrode is made of a positive electrode material, which is the ternary positive electrode material described above.

The present disclosure provides a means for calculating and characterizing the particle size and distribution of the primary particles in the secondary particles, and a ternary positive electrode material prepared by using a sintering process. The ternary positive electrode material has a D50 of 6 μm-20 μm, a BET of 0.3 m$^2$/g and 0.8 m$^2$/g, a compact density greater than 3.3 g/cc, and a number σ of the primary particles per unit area in the SEM image (at a magnification of 10000×) of the ternary positive electrode material is 5 particles/μm$^2$-50 particles/μm$^2$. The above ternary positive electrode material has following advantages: the primary particles have suitable particle size and uniformly distributed; the formed secondary particle structure are highly compacted, so as to effectively improve the structural stability of the ternary positive electrode material, avoid a large surfaces being exposed and side reactions with electrolyte caused by a crush of particles during cycling; the cycling performance of the material battery at high or low temperature is dramatically improved; the expansion of lithium batteries caused by the gas production of positive electrode material can be reduced; and battery performance using the ternary positive electrode material can be effectively improved Example 1

A ternary precursor, lithium hydroxide and titanium oxide were added into a high-speed mixer and mixed for 1 h, where a molar ratio of the ternary precursor to lithium hydroxide was 1.05 and an a mass ratio of Ti element of the added titanium oxide to the mixture was 3000 ppm, so as to obtain an initial mixture for sintering, in which the ternary precursor was [Ni$_{0.8}$Co$_{0.1}$Mn$_{0.1}$](OH)$_2$. The mixture was placed in an atmosphere sintering furnace and sintered for 15 h at a sintering temperature of 850° C. under a sintering atmosphere of oxygen, and then a ternary positive electrode material matrix was obtained.

The ternary positive electrode material matrix obtained in the first step was mixed with magnesium oxide having Mg content of 1000 ppm, and then subjected to a coat sintering in the atmosphere sintering furnace for 10 h at a sintering temperature of 400° C. Then, a Mg-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Example 2

A ternary precursor, lithium hydroxide and zirconium oxide were added into a high-speed mixer and mixed for 3 h, where a molar ratio of the ternary precursor to lithium hydroxide was 1.2 and a mass ratio of Zr element of the added zirconium oxide to the mixture was 100 ppm, so as to obtain an initial mixture for sintering, in which the ternary precursor was [Ni$_{0.7}$Co$_{0.15}$Mn$_{0.15}$](OH)$_2$. The mixture was placed in an atmosphere sintering furnace and sintered for 10 h at a sintering temperature of 700° C. under a sintering atmosphere of oxygen, and then a ternary positive electrode material matrix was obtained.

The ternary positive electrode material matrix obtained in the first step was mixed with calcium oxide having Ca content of 500 ppm, and then subjected to a coat sintering in the atmosphere sintering furnace for 5 h at a sintering temperature of 400° C. Then, a Ca-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Example 3

A ternary precursor, lithium carbonate and aluminum oxide were added into a high-speed mixer and mixed for 0.5 h, where a molar ratio of the ternary precursor to lithium carbonate was 1.0 and a mass ratio of Al element of the added aluminum oxide to the mixture was 6000 ppm, so as to obtain an initial mixture for sintering, in which the ternary precursor was [Ni$_{0.5}$Co$_{0.2}$Mn$_{0.3}$](OH)$_2$. The mixture was placed in an atmosphere sintering furnace and sintered for 18 h at a sintering temperature of 950° C. under a sintering atmosphere of air, and then a ternary positive electrode material matrix was obtained.

The ternary positive electrode material matrix obtained in the first step was mixed with aluminum oxide having Al content of 1500 ppm, and then subjected to a coat sintering in the atmosphere sintering furnace for 8 h at a sintering temperature of 700° C. Then, an Al-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Example 4

A ternary precursor, lithium carbonate, titanium oxide and aluminum oxide were added into a high-speed mixer and mixed for 1 h, where a molar ratio of the ternary precursor to lithium carbonate was 1.02, a mass ratio of Ti element of the added titanium oxide to the mixture was 1500 ppm and a mass ratio of Al element of the added aluminum oxide to the mixture was 1000 ppm, so as to obtain an initial mixture for sintering, in which the ternary precursor was [$Ni_{0.33}Co_{0.33}Mn_{0.33}$](OH)$_2$. The mixture was placed in an atmosphere sintering furnace and sintered for 20 h at a sintering temperature of 1000° C. under a sintering atmosphere of air, and then a ternary positive electrode material matrix was obtained.

The ternary positive electrode material matrix obtained in the first step was mixed with boron oxide having B content of 3000 ppm, and then subjected to a coat sintering in the atmosphere sintering furnace for 5 h at a sintering temperature of 250° C. Then, a B-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Example 5

A ternary precursor, lithium carbonate, titanium oxide were added into a high-speed mixer and mixed for 1 h, where a molar ratio of the ternary precursor to lithium carbonate was 1.03 and a mass ratio of Ti element of the added titanium oxide to the mixture was 1500 ppm, so as to obtain an initial mixture for sintering, in which the ternary precursor was [$Ni_{0.33}Co_{0.33}Mn_{0.33}$](OH)$_2$. The mixture was placed in an atmosphere sintering furnace and sintered for 20 h at a sintering temperature of 900° C. under a sintering atmosphere of air, and then a ternary positive electrode material matrix was obtained.

The ternary positive electrode material matrix obtained in the first step was mixed with aluminum oxide having Al content of 3000 ppm, and then subjected to a coat sintering in the atmosphere sintering furnace for 5 h at a sintering temperature of 270° C. Then, an Al-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Example 6

A ternary precursor, lithium carbonate, zirconium oxide and aluminum oxide were added into a high-speed mixer and mixed for 1 h, where a molar ratio of the ternary precursor to lithium carbonate was 1.02, a mass ratio of Zr element of the added zirconium oxide to the mixture was 1500 ppm and a mass ratio of Al element of the added aluminum oxide to the mixture was 1000 ppm, so as to obtain an initial mixture for sintering, in which the ternary precursor was [$Ni_{0.33}Co_{0.33}Mn_{0.33}$](OH)$_2$. The mixture was placed in an atmosphere sintering furnace and sintered for 20 h at a sintering temperature of 800° C. under a sintering atmosphere of air, and then a ternary positive electrode material matrix was obtained.

The ternary positive electrode material matrix obtained in the first step was mixed with boron oxide having B content of 2000 ppm, and then subjected to a coat sintering in the atmosphere sintering furnace for 5 h at a sintering temperature of 280° C. Then, a B-coated ternary positive electrode material was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Measurement Methods

Method for Measuring BET

BET was measured by adopting a national standard method GB/T 19587-2004 for determining a specific surface area of a solid matter.

Method for Measuring Compact Density

The compact density was measured by using a national standard method GB/T 24533-2009, where a measurement pressure is 5 tons.

Measurement of the Number of Primary Particles

Figure 1:
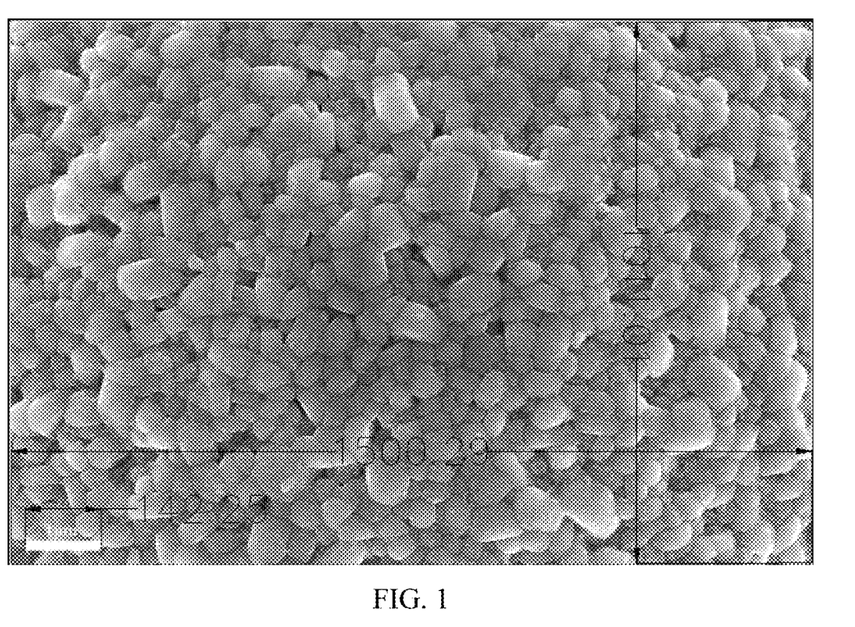
FIG. 1 is a SEM image of a ternary positive electrode material prepared in Example 1 of the present disclosure at a magnification of 10000×.
Figure 2:
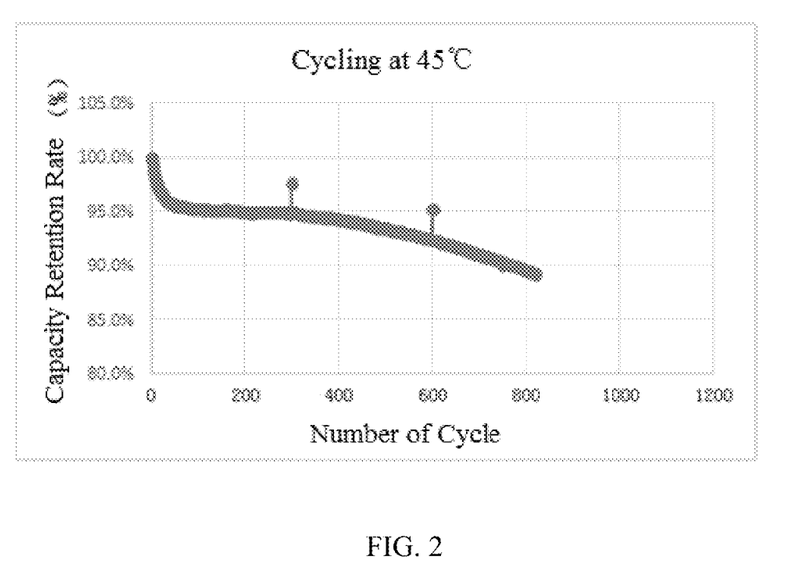
FIG. 2 is a cycling curve at 45° C. of a battery prepared by using the positive electrode material in Example 1 of the present disclosure.
Figure 3:
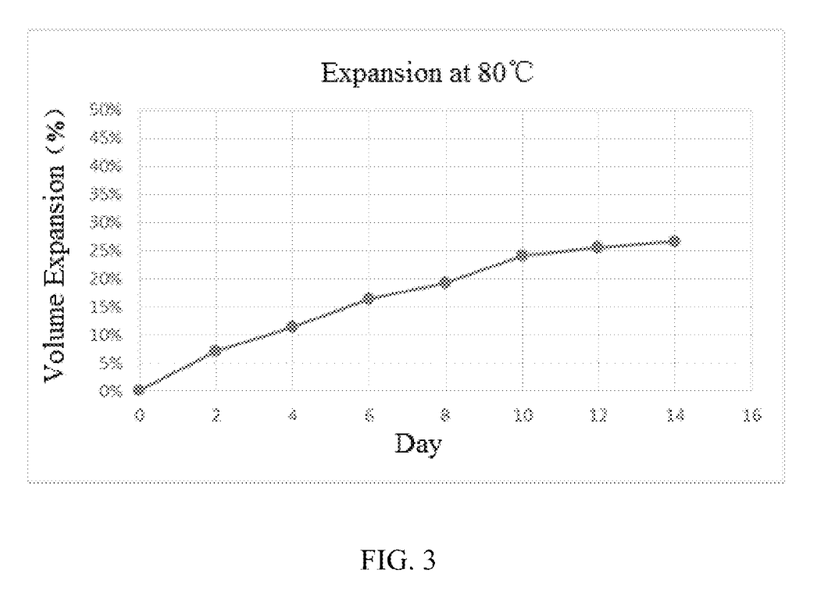
FIG. 3 is an expansion trend curve at 80° C. of a battery prepared by using the positive electrode material in Example 1 of the present disclosure.

For determining the number of primary particles per unit area in the secondary particles, a 10K-fold SEM image of the sample prepared in Example 1 is shown in FIG. 1, the number of primary particles per unit area in the secondary particles is calculated as follows.

TABLE 1

| | | | | Number of Particles | | | |
|---|---|---|---|---|---|---|---|
| Product | Size of SEM Image | | | Lower Edge | Upper Edge | Left Edge | Right Edge |
| No. | A | B | C | x1 | x2 | y1 | y2 |
| 1 | 1500.3 | 1011.0 | 142.3 | 38 | 36 | 25 | 24 |

The number of primary particles per unit area of 1 μm×1 μm was calculated according to equation σ={(x1+x2)/2*(y1+y2)/2}/(A/C*B/C).

$\sigma_1$={(38+36)/2*(25+24)/2}/(1500.3/142.3*1011.0/142.3)=12.10 particles/μm$^2$.

The calculation methods for other examples and comparative examples are the same, and the calculation results are shown in Table 1.

Comparative Example 1

A ternary precursor, lithium hydroxide and titanium oxide were added into a high-speed mixer and mixed for 1 h, where a molar ratio of the ternary precursor to lithium hydroxide was 1.05 and a mass ratio of Ti element of the added titanium oxide to the mixture was 1000 ppm, so as to obtain an initial mixture for sintering, in which the ternary precursor was $[Ni_{0.8}Co_{0.1}Mn_{0.1}](OH)_2$. The mixture was placed in an atmosphere sintering furnace and sintered for 15 h at a sintering temperature of 1100° C. under a sintering atmosphere of oxygen, and then a ternary positive electrode material matrix was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Comparative Example 2

The parameters of the preparing process are the same as that of Comparative Example 1, except the sintering temperature for initial sintering was 600° C.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Comparative Example 3

The parameters of the preparing process are the same as that of Comparative Example 1, except the sintering temperature for initial sintering was 850° C.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Comparative Example 4

A ternary precursor, lithium hydroxide and zirconium oxide were added into a high-speed mixer and mixed for 3 h, where a molar ratio of the ternary precursor to lithium hydroxide was 1.2 and a mass ratio of Zr element of the added zirconium oxide to the mixture was 100 ppm, so as to obtain an initial mixture for sintering, in which the ternary precursor was $[Ni_{0.7}Co_{0.15}Mn_{0.15}](OH)_2$. The mixture was placed in an atmosphere sintering furnace and sintered for 10 h at a sintering temperature of 500° C. under a sintering atmosphere of oxygen, and then a ternary positive electrode material matrix was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Comparative Example 5

A ternary precursor, lithium carbonate and calcium oxide were added into a high-speed mixer and mixed for 0.5 h, where a molar ratio of the ternary precursor to lithium hydroxide was 1.0 and a mass ratio of Ca element of the added calcium oxide to the mixture was 2000 ppm, so as to obtain an initial mixture for sintering, in which the ternary precursor was $[Ni_{0.5}Co_{0.2}Mn_{0.3}](OH)_2$. The mixture was placed in an atmosphere sintering furnace and sintered for 18 h at a sintering temperature of 1250° C. under a sintering atmosphere of air, and then a ternary positive electrode material matrix was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Comparative Example 6

A ternary precursor, lithium carbonate, titanium oxide and aluminum oxide were added into a high-speed mixer and mixed for 1 h, where a molar ratio of the ternary precursor to lithium hydroxide was 1.02, a mass ratio of Ti element of the added titanium oxide to the mixture was 1500 ppm and a mass ratio of Al of the added aluminum oxide to the weight of the mixture was 1000 ppm, so as to obtain an initial mixture for sintering, in which the ternary precursor was $[Ni_{0.33}Co_{0.33}Mn_{0.33}](OH)_2$. The mixture was placed in an atmosphere sintering furnace and sintered for 20 h at a sintering temperature of 600° C. under a sintering atmosphere of air, and then a ternary positive electrode material matrix was obtained.

The ternary positive electrode material prepared by the above process was taken to measure the number σ of primary particles per unit area of the secondary particles, the compact density and the BET, and then used to fabricate a battery. The capacity of the battery was measured at a rate of 1/3C, the cycling performance of the battery at 25° C. was measured at a rate of 1C/1C, the cycling performance of the battery at 45° C. was measured at a rate of 1C/1C, and the expansion trend within 10-day storage at 80° C. was measured. The results of measurement are shown in Table 2.

Preparation of Battery:

The positive electrode material modified by gradiently coated with aluminum compound, as a positive electrode active material, was mixed with a conductive agent of acetylene black and a binder of polyvinylidene fluoride (PVDF) in N-methylpyrrolidone solvent system in a weight ratio of 94:3:3, and thoroughly stirred and homogeneously mixed. Then, the mixture was coated on an aluminum foil, followed by drying and cold pressing to produce a positive electrode plate. A negative electrode active material, artificial graphite, hard carbon, a conductive agent of acetylene black, a binder of styrene-butadiene rubber (SBR), a thickener of sodium carboxymethyl cellulose (CMC) were added in a deionized water solvent system in a weight ratio of 90:5:2:2:1, and thoroughly stirred and homogeneously mixed. Then, the mixture was coated on a copper foil, followed by drying and cold pressing to produce a negative electrode plate. A PE porous polymeric film was used as a separator. The positive electrode plate, the separator and the negative electrode plate were stacked in a sequence, so that the separator can be arranged between the positive and negative electrode plates and exert isolation function, and then they were wound to a bare cell. The bare cell was placed in an outer package, the package was sealed after injecting pre-prepared base electrolyte, so as to obtain a battery.

Measurement of Initial Capacity Per Gram of Battery:

At a constant temperature of 25° C., the battery was allowed to stand for 5 minutes, discharged to 2.8V at 1/3C; the battery was allowed to stand for 5 minutes again, charged to 4.25V at 1/3C, and then charged at a constant voltage of 4.25V until the current≤0.05 mA; the battery was allowed to stand for 5 minutes again, the charging capacity at this time was recorded as C0. Then, the battery was discharged to 2.8V at 1/3C, the discharge capacity at this time was recorded as the initial capacity per gram D0, and the initial efficiency was D0/C0*100%.

Measurement of Cycling Performance of Battery at 25° C. or 45° C.

At a constant temperature of 25° C. or 45° C., at a voltage of 2.8V-4.25V, the battery was charge to 4.25V at 1C, and then charged to a current≤0.05 mA at a constant voltage of 4.25V. The battery was allowed to stand for 5 minutes, then discharged to 2.8V at 1C, the capacity was recorded as $D_n$ (n=0, 1, 2 . . . ). The previous process was repeated until the capacity fading to 80%.

Measurement of Expansion of Battery at 80° C.

The battery was stored at 80° C., with 100% SOC. Before, during and after the storage of battery, OCV, IMP, and volume of battery were measured (with respect to volume, a water displacement method was used). At the end of storage, the remaining capacity and reversible capacity of cell were measured. The battery was taken out from oven every 48 hours, and OCV and IMP of battery were measure after standing still for 1 h. After being cooled to the room temperature, the volume of the cell was measured by a water displacement method. The measurement was terminated after 20-day storage or the storage was stopped when the volume expansion was over 50%. The range of the protection voltage was 2.7-4.3V, and the nominal capacity was 2.25 Ah.

TABLE 2

Measurement Results of Powder Characterization and Electrochemical Performance of Examples and Comparative Examples

| Experiment No. | D50 (μm) | σ (particles/μm$^2$) | BET (m$^2$/g) | Compact Density (g/cc) | 1/3 C Battery Capacity (mAh/g) | 1200 Cycles at 25° C./% | 800 Cycles at 45° C./% | 10-day Expansion at 80° C./% |
|---|---|---|---|---|---|---|---|---|
| Example 1 | 10.8 | 12.10 | 0.524 | 3.59 | 201.9 | 91.1 | 89.3 | 25.7 |
| Example 2 | 8.6 | 10.12 | 0.637 | 3.56 | 198.2 | 92.1 | 88.9 | 26.3 |
| Example 3 | 12.8 | 8.91 | 0.348 | 3.62 | 159.7 | 92.8 | 89.9 | 8.9 |
| Example 4 | 15.7 | 6.32 | 0.219 | 3.71 | 143.2 | 93.2 | 89.4 | 4.7 |
| Example 5 | 17.8 | 49.5 | 0.398 | 3.57 | 147.5 | 93.7 | 89.9 | 3.7 |
| Example 6 | 6.2 | 89.5 | 0.709 | 3.52 | 141.2 | 92.9 | 88.5 | 7.2 |
| Comparative Example 1 | 13.2 | 2.31 | 0.171 | 3.78 | 188.4 | 81.1 | 69.4 | 49.1 |
| Comparative Example 2 | 11.5 | 115.1 | 1.23 | 3.31 | 182.5 | 79.6 | 61.9 | 54.3 |
| Comparative Example 3 | 5.3 | 12.79 | 0.543 | 3.56 | 192.1 | 85.1 | 72.4 | 41.8 |
| Comparative Example 4 | 22.6 | 121.2 | 1.12 | 3.23 | 180.3 | 83.4 | 68.7 | 51.3 |
| Comparative Example 5 | 5.3 | 3.72 | 0.156 | 3.69 | 148.1 | 81.8 | 65.4 | 20.3 |
| Comparative Example 6 | 11.9 | 89.2 | 1.43 | 3.25 | 134.5 | 85.2 | 73.6 | 18.4 |

By comparing Comparative Examples 1, 2 and 3, it can be found that, when the initial sintering temperature is too high or too low, the number of the primary particles per unit area of the secondary particles is too small or too big, and the sintered products in Comparative Examples 1 and 2 a poorer comprehensive electrochemical performance than that in Comparative Example 3. By comparing Comparative Example 3 with Example 1, it can be seen that, after coating a coating agent on the surface, both the cycling performance and the expansion resistance were improved, indicating that the coating agent can effectively improve the cycling performance and the expansion resistance of the positive electrode material. By comparing Examples 4, 5 and 6, it can be seen that, the electrochemical performance in a case of the number σ of primary particles ranging from 5 to 50 particles/μm$^2$ is better than that in a case where the primary particle number σ ranges from 50 to 100 particles/μm$^2$. By comparing Example 6 with Comparative Example 6, it can be seen that when the number σ ranges from 50 to 100 particles/μm$^2$, BET is relatively great, compact density is relatively low, electrochemical properties are poorer. Through comparing Examples 1, 2, 3, 4 with Comparative Example 1, 2, 4, 5, 6, it can be seen that, by using the positive electrode material prepared by the method according to the present disclosure and comprising secondary particles in which the primary particles have suitable particle size and are homogenously distributed, the number σ of primary particles per unit area of secondary particles ranges between 5 to 50 particles/μm$^2$, BET is maintained in a range of 0.3-0.8 m$^2$/g, and the compact density is greater than 3.3 g/cc, the capacity is substantially increased enhanced, and both cycling performance and expansion resistance are significantly improved.

The above preferred embodiments are merely intended to describe the present disclosure, but not intended to limit the scope of the claims. Any changes and modifications can be made by those skilled in the art, without departing from the scope of the present disclosure. The protection scope is defined by the claims of the present disclosure.

What is claimed is:

1. A ternary positive electrode material, comprising secondary particles composed of primary particles, wherein the secondary particles have an average particle diameter D50 in a range of 6 μm to 20 μm and a BET in a range of 0.2 m$^2$/g to 1 m$^2$/g, and a number σ of the primary particles per unit area of the secondary particles is in a range of 5 particles/μm$^2$ to 100 particles/μm$^2$, the primary particles have a length in a range of 100 nm to 1000 nm, and a width in a range of 50 nm to 400 nm; and the primary particles have a ratio of length to width in a range of 2 to 20; and
wherein the ternary positive electrode material has a formula of $Li_{1+a}[Ni_xCo_yMn_zM1_bM2_c]O_{2-d}N_d$, where element M1 and element M2 are each independently selected from at least one of Al, Zr, Ti, Mg, Zn, B, Ca, Ce, Te and Fe, element N is selected from at least one of F, Cl and S, 0<x<1, 0<y≤0.3, 0<z≤0.3, −0.1<a<0.2, 0<b<0.3, 0<c<0.3, 0≤d<0.2, 0<b+c<0.3, and x+y+z+b=1.

2. The ternary positive electrode material according to claim 1, wherein the ternary positive electrode material has an compact density greater than or equal to 3.3 g/cc.

3. The ternary positive electrode material according to claim 1, wherein the number σ of the primary particles per unit area of the secondary particles in the ternary positive electrode material is a range of 5 particles/μm$^2$ to 50 particles/μm$^2$.

4. The ternary positive electrode material according to claim 1, wherein the BET of the secondary particles is in a range of 0.3 m$^2$/g to 0.8 m$^2$/g.

5. The ternary positive electrode material according to claim 1, wherein 0.6<x<1.

6. The ternary positive electrode material according to claim 1, wherein a total doping amount of the element M1 and element M2 in the ternary positive electrode material is a range of 200 ppm to 9000 ppm.

7. The ternary positive electrode material according to claim 1, wherein the number σ of the primary particles per unit area of the secondary particles in the ternary positive electrode material is determined by:

(1) performing a SEM measurement on a sample of the ternary positive electrode material comprising the secondary particles having the average particle diameter D50 in a range of 6 μm to 20 μm, so as to obtain a SEM image at a magnification of 10000×;

(2) calculating the number σ of the primary particles per unit area of the secondary particles in the ternary positive electrode material based on the SEM image by using following equations:

$$\sigma = \{(x1+x2)/2 * (y1+y2)/2\}/(A/C*B/C), \text{particles}/\mu m^2,$$
wherein x1 represents a number of the primary particles along a lower edge of the SEM image of the secondary particles;

x2 represents a number of the primary particles along an upper edge of the SEM image of the secondary particles;

y1 represents a number of the primary particles along a left edge of the SEM image of the secondary particles;

y2 represents a number of the primary particles along a right edge of the SEM image of the secondary particles;

A represents an actual length in millimeter of the upper or lower edge of the SEM image of the secondary particles;

B represents an actual length in millimeter of the left or right edge of the SEM image of the secondary particles; and C represents an actual length in a unit of mm/μm of a scale of 1 μm in the SEM image of the secondary particles;

wherein when counting the number of the primary particles in the SEM image of the secondary particles, a primary particle, which is partially included in the SEM image, is counted as one primary particle.

8. A lithium ion battery, comprising a positive electrode, a negative electrode, a separator arranged between the positive electrode and the negative electrode, and electrolyte, wherein the positive electrode is made of a positive electrode material, which is the ternary positive electrode material according to claim 1.

* * * * *